US012567965B2

(12) United States Patent
Yang et al.

(10) Patent No.: US 12,567,965 B2
(45) Date of Patent: Mar. 3, 2026

(54) SYSTEM AND METHOD FOR APPROXIMATE HOMOMORPHIC RING ENCRYPTION

(71) Applicant: HUAWEI TECHNOLOGIES CO., LTD., Shenzhen (CN)

(72) Inventors: Wenzhe Yang, Waterloo (CA); Kamalaldin Mozaffari Majd, Waterloo (CA); Yanjun Qian, Waterloo (CA); Zhiwei Shang, Waterloo (CA); Mohamed Tolba, Kitchener (CA); Yunjie Yi, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 66 days.

(21) Appl. No.: 18/633,010

(22) Filed: Apr. 11, 2024

(65) Prior Publication Data

US 2025/0323785 A1    Oct. 16, 2025

(51) Int. Cl.
H04L 9/30 (2006.01)
H04L 9/00 (2022.01)
H04L 9/06 (2006.01)

(52) U.S. Cl.
CPC ............ H04L 9/3093 (2013.01); H04L 9/008 (2013.01); H04L 9/06 (2013.01)

(58) Field of Classification Search
None
See application file for complete search history.

(56) References Cited

U.S. PATENT DOCUMENTS

| | | | | |
|---|---|---|---|---|
| 9,436,835 | B1 | 9/2016 | Saldamli | |
| 2017/0373834 | A1* | 12/2017 | Mandal | H04L 9/008 |
| 2021/0075588 | A1* | 3/2021 | Khedr | H04L 9/008 |
| 2022/0014351 | A1* | 1/2022 | Jung | H04L 9/0869 |
| 2025/0260555 | A1* | 8/2025 | Jung | H04L 9/30 |

FOREIGN PATENT DOCUMENTS

| | | |
|---|---|---|
| CN | 115994546 A | 4/2023 |
| CN | 116827518 A | 9/2023 |

OTHER PUBLICATIONS

Cheon, Jung Hee, et al. "Homomorphic encryption for arithmetic of approximate numbers." Advances in Cryptology—ASIACRYPT 2017: 23rd International Conference on the Theory and Applications of Cryptology and Information Security, Hong Kong, China, Dec. 3-7, 2017, Proceedings, Part I 23. Springer International Publishing, 2017.

* cited by examiner

*Primary Examiner* — William J. Goodchild
(74) *Attorney, Agent, or Firm* — Slater Matsil, LLP

(57) ABSTRACT

Embodiments of the present application provide a system, a device, and a method for approximate homomorphic ring encryption. A message z, which is an (n/4)×(n/2) matrix may be encoded to a polynomial M(X, Y) in a polynomial ring $\mathcal{R} = \mathbb{Z}[X, Y]/\langle X^{n/2}+1, Y^{n/2}-(X^{n/8}-X^{3n/8})\rangle$. The polynomial M(X, Y) may then be encrypted to a ciphertext and sent to a target device. Encoding in the polynomial ring $\mathcal{R}$ allows at least approximate homomorphic manipulation of the subsequent ciphertext for improved security.

20 Claims, 4 Drawing Sheets

400

300

305
Set parameters

310
Generate keys

315
Obtain message

320
Encode message

325
Encrypt encoded message

330
Send encrypted message

335
Receive and decrypt
manipulated ciphertext

SYSTEM AND METHOD FOR APPROXIMATE HOMOMORPHIC RING ENCRYPTION

FIELD

The specification relates generally to encryption systems and methods, and more particularly to a system and method for approximate homomorphic ring encryption.

BACKGROUND

Encryption algorithms are used to encrypt data to be securely transmitted from a source device to a target device. Encryption algorithms may use problems which are computationally hard to solve, such as prime factorization problems, to preclude third parties from intercepting and determining the contents of the secure message.

SUMMARY

According to an aspect of the present application, a system, device and method for approximate homomorphic ring encryption is provided. The system, and particularly a device: of the system encodes messages in a two-variable polynomial ring, namely $$\mathcal{R} = \mathbb{Z}[X, Y] / \left\langle X^{\frac{n}{2}} + 1, Y^{\frac{n}{2}} - \left( X^{\frac{n}{8}} - X^{\frac{3n}{8}} \right) \right\rangle.$$

Encryption of polynomials in the ring $\mathcal{R}$ is at least approximately homomorphic, wherein operations performed on the encrypted ciphertext in the ciphertext space result in a manipulated ciphertext, which when decrypted, approximately represents the same operation as performed on the original message. Thus, arithmetic operations may be performed on the encrypted ciphertext without decryption and thus without jeopardizing the security of the encrypted data. Furthermore, encryption in the two-variable polynomial ring $\mathcal{R}$ may allow for efficient and computationally less-complex number theoretic transforms to be applied.

In particular, a device may include: a memory, a communications interface, and a processor interconnected with the memory and communications interface. The processor may be configured to: obtain a message z to be securely sent to a target device, wherein the message z is an $(n/4) \times (n/2)$ matrix with entries $z_{ij} \in \mathbb{C}$, $0 \leq i < n/4$ and $0 \leq j < n/2$ and wherein $n=2^l$, where $l \in \mathbb{Z}$; encode the message z to a polynomial M(X, Y) in the polynomial ring $\mathcal{R} = \mathbb{Z}[X,Y]/\langle [X, Y]/ \langle X^{n/2}+1, Y^{n/2}-(X^{n/8}-X^{3n/8}) \rangle \rangle$, wherein $$M(X, Y) = \sum_{i=0}^{n/2-1} \sum_{j=0}^{n/2-1} m_{i,j} X^i Y^j, \ m_{i,j} \in \mathbb{Z},$$

such that $$z_{i,j} = \frac{1}{\Delta} M \left( X = \zeta_n^{5^i}, \ Y = \zeta_n^{2 \cdot j \cdot 5^i + \frac{5^i - 1}{4}} \sqrt[4]{2} \right),$$

where $\zeta_n$ the $n^{th}$ root of unity, and $\Delta \in \mathbb{Z}$; encrypt the polynomial M(X, Y) with a public key to obtain a ciphertext; and send the ciphertext to the target device.

In further examples, the processor may be configured to generate a secret key for secure encryption; and generate the public key based on the secret key.

In further examples, the processor may generate the secret key and the public key by: selecting a secret $s \in \mathcal{R}$ according to $S \leftarrow HWT(h)$, where h is a positive integer, and HWT(h) is a uniform distribution over the subset of $$\{\pm 1\}^{\frac{n}{2} \times \frac{n}{2}};$$

selecting a polynomial $a \in \mathcal{R}_{q_L}$ uniformly randomly; selecting a small polynomial, namely $e \leftarrow DG(\sigma^2)$, where DG is a distribution over $$\mathbb{Z}^{\frac{n}{2} \times \frac{n}{2}}$$

that samples its components independently from a discrete Gaussian distribution with variance $\sigma^2$; and defining the secret key to be sk=(1, s); and defining the public key to be $$pk = (b, a) \in \mathcal{R}_{q_L}^2,$$

where $b \in \mathcal{R}_{q_L}$ is given by $b \leftarrow -a \cdot s + e \bmod q_L$.

In further examples, the processor may be configured to generate an evaluation key for use in multiplicative operations.

In further examples, the processor may generate the evaluation key by: selecting an integer P; selecting a polynomial $$a' \in \mathcal{R}_{P \cdot q_L}$$

uniformly randomly; selecting a small polynomial, namely $e \leftarrow DG(\sigma^2)$, where DG is a distribution over $$\mathbb{Z}^{\frac{n}{2} \times \frac{n}{2}}$$

that samples its components independently from a discrete Gaussian distribution with variance $\sigma^2$; and defining the evaluation key to be $$evk = (b', a') \in R_{q_L}^2,$$

where $b' \in \mathcal{R}_{q_L}$ is given by $b' \leftarrow -a' \cdot s + e' + P \cdot s^2 \bmod P \cdot q_L$.

In further examples, the processor may be configured to generate a switching key for use in converting ciphertext from a first ciphertext space based on a first secret key to a second ciphertext space based on a second secret key.

In further examples, the processor may generate the switching key by: selecting an integer P; selecting a polynomial $$a' \in \mathcal{R}_{P \cdot q_L}$$

3 uniformly randomly; selecting a small polynomial, namely $e' \leftarrow DG(\sigma^2)$, where DG is a distribution over $$\mathbb{Z}^{\frac{n}{2} \times \frac{n}{2}}$$

that samples its components independently from a discrete Gaussian distribution with variance $\sigma^2$; and defining the switching key swk, for another secret $s' \in \mathcal{R}$, to be swk=(b', a'), where $b' \in \mathcal{R}_{q_L}$ is given by $b' \leftarrow -a' \cdot s + e' + P \cdot s'$ mod $P \cdot q_L$.

In further examples, the processor may be configured to receive a manipulated ciphertext comprising a result of an operation performed on the ciphertext; decrypt the manipulated ciphertext using a secret key corresponding to the public key; and decode the decrypted manipulated ciphertext to obtain a manipulated message, the manipulated message represents a result of the operation as performed on the message.

According to another example, a method includes: obtaining a message z to be securely sent to a target device, wherein the message z is an $$\left(\frac{n}{4}\right) \times \left(\frac{n}{2}\right)$$

matrix with entries $$z_{i,j} \in \mathbb{C}, 0 \le i < \frac{n}{4} \text{ and } 0 \le j < \frac{n}{2}$$

and wherein $n=2^l$, where $l \in \mathbb{Z}$; encoding the message z to a polynomial $M(X,Y)$ in a polynomial ring $\mathcal{R} = Z[X,Y]/\langle X^{n/2}+1, Y^{n/2}-(X^{n/8}-X^{3n/8})\rangle$ wherein $$M(X, Y) = \sum_{i=0}^{\frac{n}{2}-1} \sum_{j=0}^{\frac{n}{2}-1} m_{i,j} X^i Y^j, m_{i,j} \in \mathbb{Z},$$

such that $$z_{i,j} = \frac{1}{\Delta} M\left(X = \zeta_n^{si}, Y = \zeta_n^{2j \cdot si + \frac{si-1}{4}} \sqrt[n]{2}\right),$$

where $\zeta_n$ is the $n^{th}$ root of unity, and $\Delta \in \mathbb{Z}$; encrypting the polynomial $M(X, Y)$ with a public key to obtain a ciphertext; and sending the ciphertext to the target device.

In further examples, encrypting the polynomial M includes: sampling $V \leftarrow ZO(0.5)$ and $E_0, E_1 \leftarrow DG(\sigma^2)$, for a real positive number $\sigma$, where: $ZO(\rho)$ for $0 \le \rho \le 1$ is a distribution that samples each entry in an $$\frac{n}{2} \times \frac{n}{2}$$

matrix from $\{0, \pm 1\}$ with probability $$\frac{\rho}{2}$$

4 for both of −1 and 1, and with probability $1-\rho$ for 0; and $DG(\sigma^2)$ is a distribution over $$\mathbb{Z}^{\frac{n}{2} \times \frac{n}{2}}$$

that samples components independently from a discrete Gaussian distribution with variance $\sigma^2$; and outputting, as the ciphertext, $V \cdot pk + (M+E_0, E_1)$ mod $q_L$, where pk is the public key, and $q_L = p^L$ for a base positive integer $p > \Delta$ and a positive integer L.

In further examples, the method may additionally include: selecting parameters such that the ring-learning with errors (RLWE) problem in $\mathcal{R}$ achieves a target threshold $\lambda$ bits of security.

In further examples, the method may additionally include: receiving a manipulated ciphertext comprising a result of an operation performed on the ciphertext; decrypting the manipulated ciphertext using a secret key corresponding to the public key; and decoding the decrypted manipulated ciphertext to obtain a manipulated message, wherein the manipulated message represents a result of the operation as performed on the message.

In further examples, decrypting the manipulated ciphertext may include: for the manipulated ciphertext given by $$ct = (c_0, c_1) \in \mathcal{R}_{q_l}^2,$$

and the secret key given by s, determining $c_0 + c_1 \cdot s$ mod $q_l$.

According to another example, a device includes: a memory; a communications interface; and a processor interconnected with the memory and the communications interface, the processor configured to: receive a first ciphertext $ct_1$ encrypted from a first polynomial $M_1(X,Y)$ in the polynomial ring $\mathcal{R} = \mathbb{Z}[X,Y]/\langle X^{n/2}+1, Y^{n/2}-(X^{n/8}-X^{3n/8})\rangle$ using a public key pk; select an operation to be applied to the first ciphertext and obtain a second message to be used as a second operand for the operation; encode the second message to a second polynomial $M_2(X, Y)$ in the polynomial ring $\mathcal{R}$; encrypting the second polynomial $M_2(X, Y)$ using the public key pk to obtain a second ciphertext $ct_2$; apply the operation on $ct_1$ and $ct_2$ to obtain a resulting ciphertext $ct_r$; and sending the resulting ciphertext $ct_r$ to a target device.

In further examples, the processor may be configured to output the resulting ciphertext as: $ct_r = ct_1 + ct_2$ mod $q_l$, when the operation is addition.

In further examples, the processor may be configured to determine, for $ct_1 = (B_1, A_1)$ and $ct_2 = (B_2, A_2)$, $(D_0, D_1, D_2) = (B_1 \cdot B_2, A_1 \cdot B_2 + A_2 \cdot B_1, A_1 \cdot A_2)$ mod $q_l$; and re-linearize according to $ct_r = (D_0, D_1) + \lfloor P^{-1} \cdot D_2 \cdot evk \rceil$ mod $q_l$, for an evaluation key evk corresponding to the secret key, when the operation is multiplication.

In further examples, the processor may further be configured to rescale the resulting ciphertext $ct_r$ from a level l to a lower level l' according to $ct' \leftarrow \lfloor p^{l'-l} \cdot ct \rceil$ mod $q_{l'}$.

According to another example, a non-transitory computer-readable medium stores instructions which when executed by a processor, cause the processor to: obtain a message z to be securely sent to a target device, wherein the message z is an $(n/4) \times (n/2)$ matrix with entries $z_{i,j} \in \mathbb{C}$, $0 \le i < n/4$ and $0 \le j < n/2$ and wherein $n=2^l$, where $l \in \mathbb{Z}$; encode the message z to a polynomial $M(X, Y)$ in the polynomial ring $\mathcal{R}$ wherein $$M(X, Y) = \sum_{i=0}^{n/2-1} \sum_{j=0}^{n/2-1} m_{i,j} X^i Y^j, \; m_{i,j} \in \mathbb{Z}$$

such that $$z_{i,j} = \frac{1}{\Delta} M\left(X = \zeta_n^{5^i}, \; Y = \zeta_n^{2 \cdot 5^i + \frac{5^i - 1}{4}} \sqrt[n]{2}\right)$$

where $\theta_n$ is the $n^{th}$ root of unity, and $\Delta \in \mathbb{Z}$; encrypt the polynomial $M(X, Y)$ with a public key to obtain a ciphertext; and send the ciphertext to the target device.

In further examples, the instructions further configure the processor to select a secret $s \in \mathcal{R}$ according to $S \leftarrow \text{HWT}(h)$, where h is a positive integer, and HWT(h) is a uniform distribution over the subset of $$\{\pm 1\}^{\frac{n}{2} \times \frac{n}{2}};$$

select a polynomial $a \in \mathcal{R}_{q_L}$, uniformly randomly; select a small polynomial, namely $e \leftarrow \text{DG}(\sigma^2)$, where DG is a distribution over $$\mathbb{Z}^{\frac{n}{2} \times \frac{n}{2}}$$

that samples its components independently from a discrete Gaussian distribution with variance $\sigma^2$; and define a secret key to be sk=(1, s); and define a public key to be $$pk = (b, a) \in \mathcal{R}_{q_L}^2,$$

where $b \in \mathcal{R}_{q_L}$ is given by $b \leftarrow -a \cdot s + e \mod q_L$.

In further examples, the instructions further configure the processor to: receive a manipulated ciphertext comprising a result of an operation performed on the ciphertext; decrypt the manipulated ciphertext using a secret key corresponding to the public key; and decode the decrypted manipulated ciphertext to obtain a manipulated message, the manipulated message represents a result of the operation as performed on the message.

BRIEF DESCRIPTION OF DRAWINGS

Implementations are described with reference to the following figures, in which.

DETAILED DESCRIPTION

Encryption may be based on problems such as, for example, prime factorization. These problems have been determined to be hard problems but may become solvable given a sufficiently powerful quantum computer. Accordingly, new post-quantum encryption schemes remain secure against quantum attacks are sought.

One example of a post-quantum encryption scheme is based on a learning with errors (LWE), which can be extended to ring learning with errors (RLWE) approach. The RLWE approach converts matrix multiplication to polynomial multiplication, thereby enabling number-theoretic transforms (NTTs) to be applied to increase processing speed and reduce processing and computational burden. For a sufficiently large power-of-two integer N on which the RLWE ring is based, the NTT for the one-variable ring may remain slow.

Accordingly, as described herein, a system for approximate homomorphic ring encryption is provided. In particular, the system is configured to encode messages in a two-variable polynomial ring, namely $$R = \mathbb{Z}[X, Y]/\langle X^{\frac{n}{2}} + 1, \; Y^{\frac{n}{2}} - \left(X^{\frac{n}{8}} - X^{\frac{3n}{8}}\right)\rangle.$$

The system may then encrypt to $$\mathcal{R}_q^2,$$

where $\mathcal{R}_q = \mathcal{R}/q\mathcal{R}$. The system provides security against quantum attacks and higher speed and reduced processing burden of polynomial multiplication. Further, encoding in two-variables allows a two-variable number theoretic transform to be applied, to further reduce the burden of the polynomial multiplication.

Figure 1:
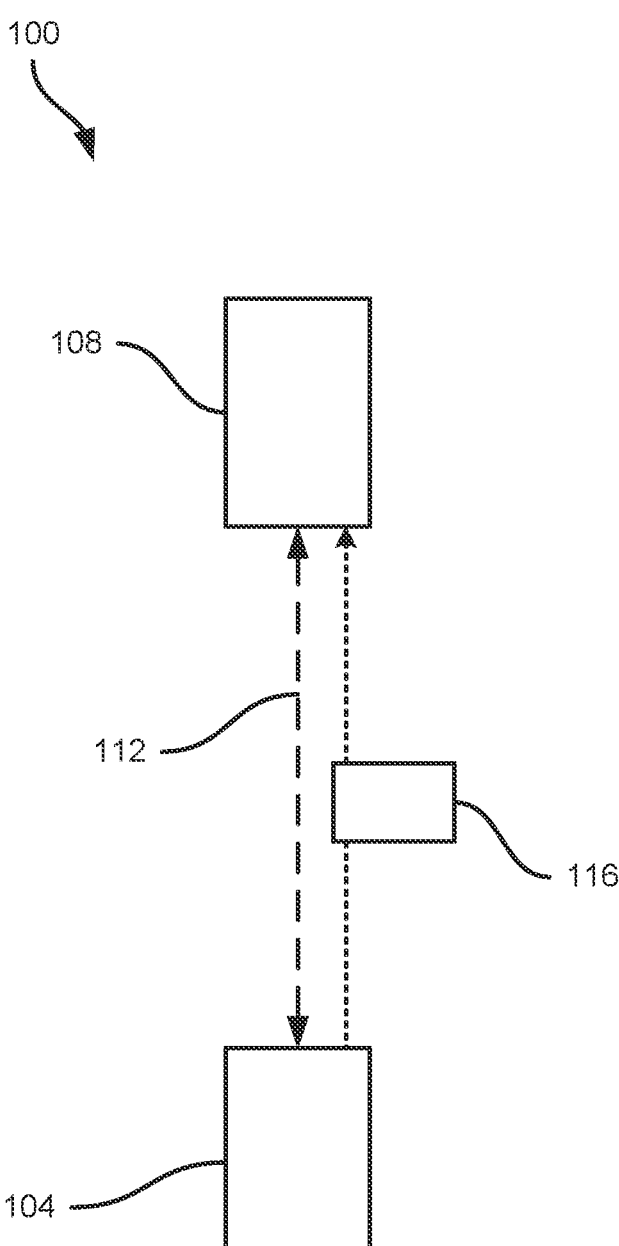
FIG. 1 depicts a schematic diagram of an example system for approximate homomorphic ring encryption.

FIG. 1 depicts a system 100 for approximate homomorphic ring encryption. The system 100 includes a computing device 104 configured for homomorphic ring encryption. The computing device 104 is in communication with a second computing device 108 via one or more communication links 112, including wired and/or wireless communication links, combinations thereof, links which traverse one or more networks, including local area networks, wide-area networks, the internet, and the like.

The computing devices 104 and 108 may be any suitable computing devices, such as, but not limited to, mobile computing devices such as phones, smart phones, tablets, laptop computers, handheld and/or wearable devices, and the like, or fixed computing devices, such as desktop computers, servers, kiosks, and the like. In particular, the computing devices 104 and 108 may be in communication to exchange one or more messages 116. In the presently illustrated example, the computing device 104 sends a message 116 to the computing device 108. Accordingly, as used herein, the computing device 104 may be referred to as the source device 104, and the computing device 108 may be referred to as the target device 108. When the computing device 108 returns another message 116 to the computing device 104, the roles of source and target devices may be reversed.

When the message 116 is sent via the communication link 112, the message 116 may be vulnerable to attack by a third party to extract information from the message 116. Accordingly, the source device 104 may be configured to encrypt the message 116 prior to sending the message 116 to the target device 108.

Furthermore, security of the message 116 may be limited by security at each point in the communication link—i.e., by the security of the encryption algorithm and by security at the target device 108. Accordingly, in some examples, the source device 104 may employ homomorphic encryption, in which an algebraic structure is defined on the ciphertext (i.e., the encrypted messages 116). That is, arithmetic operations may be performed on the ciphertext in the ciphertext space by the target device 108 and the encrypted resulting ciphertext may be returned to the source device 104 for decryption.

Thus, for example, two encryptions may be given as follows:

$$z_1 \xrightarrow[encrypt]{} ct_1 \xrightarrow[decrypt]{} z_1$$

$$z_2 \xrightarrow[encrypt]{} ct_2 \xrightarrow[decrypt]{} z_2$$

Arithmetic operations may then be performed on the ciphertexts, namely: $ct_1 + ct_2$ and $ct_1 \cdot ct_2$. Moreover, decryption is homomorphic:

$$ct_1 + ct_2 \rightarrow z_1 + z_2$$

$$ct_1 \cdot ct_2 \rightarrow z_1 \cdot z_2$$

That is, a manipulated ciphertext defined by an operation performed on the ciphertext in the ciphertext space may be decrypted, and the resulting decrypted message represents the same operation as performed on the original message.

In some examples, an approximately homomorphic scheme is sufficient, wherein:

$$z \xrightarrow[encrypt]{} ct \xrightarrow[decrypt]{} z'$$

In an approximately homomorphic scheme, z' is an approximation of z. In many applications, for example, when the data in the message z is already an approximation, then an approximately homomorphic scheme is sufficient to preserve the data. Thus, arithmetic operations may be performed on the ciphertext in the ciphertext space by the target device 108 to reduce the number of points of vulnerability to an attack. That is, since the operations are performed in the ciphertext space, operations at the target device 108 are also secure to the extent that the encryption algorithm is secure. Accordingly, homomorphic encryption or approximately homomorphic encryption by the source device 104 allows security to be maintained on the encrypted data while also preserving the results of the operation to be decrypted by the original source device 104.

Accordingly, maintaining security of the data relies on the security of the encryption algorithm used by the source device 104. In particular, to maintain security of the encrypted data, encryption algorithms may rely on hard mathematical problems, such as the integer factorization problem, the discrete logarithm problem, or the elliptic-curve discrete logarithm problem. The above-noted mathematical problems could be solved on a sufficiently powerful quantum computer, such as by running Shor's algorithm, and accordingly, some source devices 104 may employ post-quantum cryptographic algorithms, which are theorized to be secure against attacks by a quantum computer.

For example, in accordance with the present example, the source device 104 may employ post-quantum encryption based on a ring learning with errors (RLWE) approach, which provides an approximately homomorphic encryption scheme.

The RLWE approach is grounded in the more general learning with errors (LWE) approach. The LWE problem states that given pairs of the form $(a_i, b_i) = (a_i, \langle a_i, s \rangle + e_i)$ where $$a_i, s \in \mathbb{Z}_q^n,$$

$a_i$ is uniformly sampled, and $e_i \in \mathbb{Z}_q$, such pairs are difficult to distinguish from truly random pairs in $$\mathbb{Z}_q^n \times \mathbb{Z}_q.$$

Accordingly, given a number of such pairs, determining the secret s is a hard problem to solve.

The LWE encryption approach takes advantage of this problem by defining n pairs in matrix form as (A, A·s+e), where $$A \in \mathbb{Z}_q^{n \times n}, e \in \mathbb{Z}_q^n.$$

A public key pk can therefore be defined as pk=(−A·s+e, A) and encryption and decryption of a message z has the following form:

$$ct = (m, 0) + p = (z - A \cdot s + e, A) = (c_0, c_1)$$

$$z' = c_0 + c_1 \cdot s = z - A \cdot s + e + A \cdot s = z + e$$

Thus, for sufficiently small values e, the decrypted message z' will be approximately equal to the original message z. In some examples, additional rounding operations may be applied to obtain the original message z.

The LWE approach can then be further extended to the RLWE approach, in which polynomials p in $\mathbb{Z}_q[X]/\langle X^N + 1 \rangle$ are used instead of vectors in $$\mathbb{Z}_q^n.$$

Multiplications may therefore be performed on polynomials using number theoretic transforms (NTTs) and are therefore computationally less complex and less intensive. When N is large (e.g., $2^{16}$ or greater), the NTT for the one-variable ring $\mathbb{Z}[X]/\langle X^N + 1 \rangle$ may still be slow, due to the large size of N.

Accordingly, in the present example, the source device 104 is configured to encode the message 116 to a two-variable polynomial M(X, Y) of the form:

$$M(X, Y) = \sum_{i=0}^{n/2-1} \sum_{j=0}^{n/2-1} m_{i,j} X^i Y^j, \ m_{i,j} \in \mathbb{Z}$$

The polynomial M(X, Y) is an element of a polynomial ring $\mathcal{R} = \mathbb{Z}[X, Y]/\langle X^{n/2+1}, Y^{n/2+1}, Y^{n/2} - (X^{n/8} - X^{3n/8}) \rangle$. The source device 104 may subsequently encrypt the polynomial M (X, Y) in accordance with a two-variable RLWE approach, as will be described in further detail herein. That is, the presently described approximately homomorphic encryption algorithm allows a two-variable NTT approach to be applied to further reduce processing time and computational complexity for large values of n.

Figure 2:
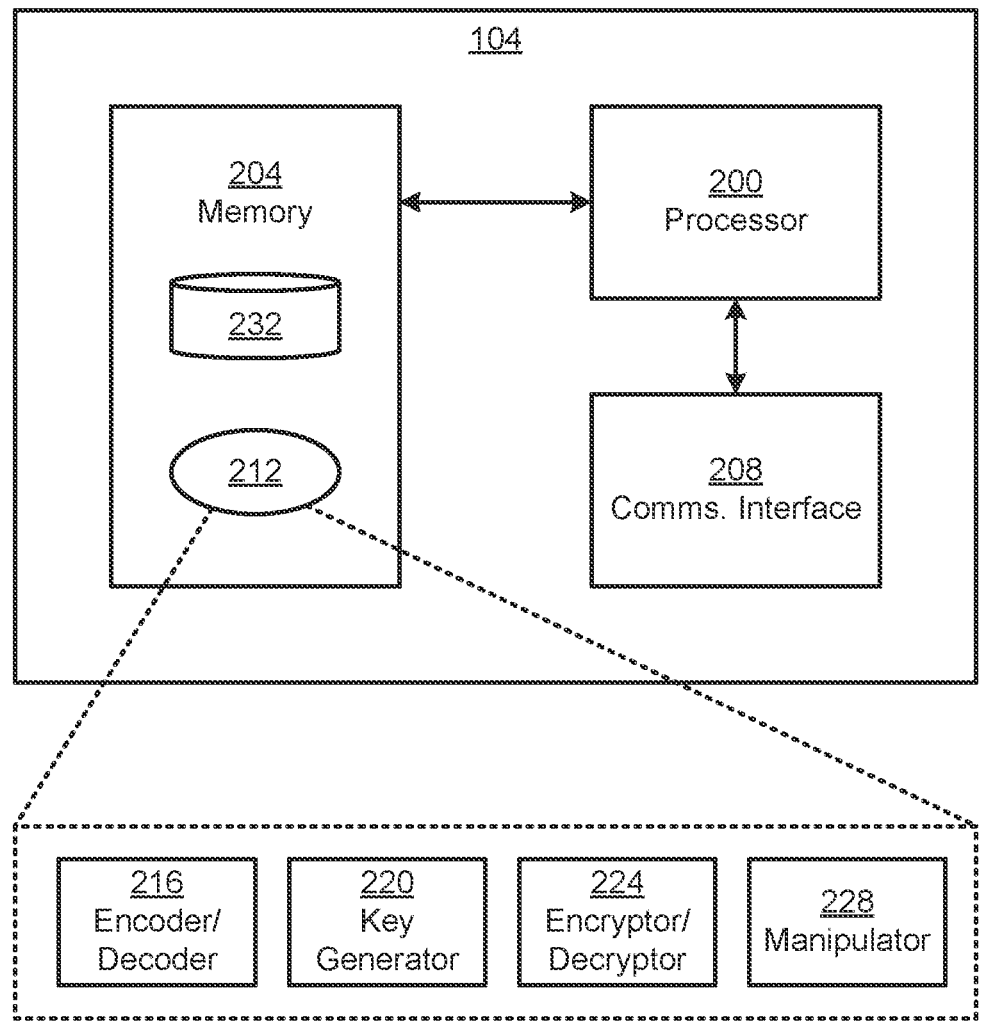
FIG. 2 depicts a block diagram of certain internal components of the device of FIG. 1.

Turning now to FIG. 2, certain internal components of the device 104 are depicted in greater detail. The device 104 includes a processor 200, a memory 204 and a communications interface 208.

The processor 200 may include a central processing unit (CPU), a microcontroller, a microprocessor, a processing core, a field-programmable gate array (FPGA), a graphics processing unit (GPU), or similar. The processor 200 may include multiple cooperating processors. The processor 200 may cooperate with the memory 204 to realize the functionality described herein.

The memory 204 may include a combination of volatile (e.g., Random Access Memory or RAM) and non-volatile memory (e.g., read-only memory or ROM, Electrically Erasable Programmable Read Only Memory or EEPROM, flash memory). All or some of the memory 204 may be integrated with the processor 200. The memory stores applications, each including a plurality of computer-readable instructions executable by the processor 200. The execution of the instructions by the processor 200 configures the device 104 to perform the actions discussed herein. In particular, the applications stored in the memory 204 include an encryption application 212. When executed by the processor 200, the application 212 configures the processor 200 and/or the device 104 to perform various functions discussed below in greater detail and related to the encryption operation of the device 104. The application 212 may also be implemented as a suite of distinct applications.

For example, in the present example, the application 212 may be implemented a series of modules including an encoder/decoder 216, a key generator 220, an encryptor/decryptor 224, and a manipulator 228.

The encoder/decoder 216 is configured to obtain a message z, such as the message 116, to be securely sent to a target device and encode the message into the polynomial ring $\mathcal{R}$. In particular, the message z has the form of an (n/4)×(n/2) matrix with entries $z_{i,j} \in \mathbb{C}$, $0 \le i < n/4$ and $0 \le j < n/2$. The encoder/decoder 216 is configured to encode the message z to the plaintext space of the approximate homomorphic encryption scheme, namely the ring $\mathcal{R}$, and in particular, to a polynomial M(X, Y), where:

$$M(x, y) = \sum_{i=0}^{n/2-1} \sum_{j=0}^{n/2-1} m_{i,j} X^i Y^j, \ m_{i,j} \in \mathbb{Z}$$

The polynomial M(X, Y) may further be represented as an $$\left(\frac{n}{2}\right) \times \left(\frac{n}{2}\right)$$

matrix $$M = (m_{i,j}) \in \mathbb{Z}^{\frac{n}{2} \times \frac{n}{2}}.$$

Accordingly, the encoder/decoder 216 may be configured to determine an encoding map and a decoding map. In particular, decoding is given by the map σ:

$$M \in \mathcal{R} \mapsto z = (z_{i,j}) \in \mathbb{C}^{\frac{n}{4} \times \frac{n}{2}}$$

and encoding is given by the map $\sigma^{-1}:(z_{i,j}) \to \mathcal{R}$. Furthermore, the decoding of the polynomial M(X, Y) is given by the evaluations at the roots of $$X^{\frac{n}{2}} + 1 \text{ and } Y^{\frac{n}{2}} - \left(X^{\frac{n}{8}} - X^{\frac{3n}{8}}\right).$$

Accordingly, the encoding map-1 may be derived by the encoder/decoder 216 as follows. Let $z_{i,\_}$ be the i-th row of z, such that $z_{i,\_}=(z_{i,0}, z_{i,1}, \ldots, z_{i,n/2-1})$. Then, for every i, let the row vector $u_i$ be defined as $$u_i = \left(1, \zeta_n^{5^i}, \ldots, \sigma_n^{\left(\frac{n}{2}-1\right)5^i}\right), \ 0 \le i < n/4.$$

Let U be the $$\frac{n}{4} \times \frac{n}{2}$$

matrix whose i-th row is $u_i$. Let $V_i$ be the $$\frac{n}{2} \times \frac{n}{2}$$

matrix whose (l,j)-th entry is $$(V_i)_{l,j} = \left(\zeta_n^{2j \cdot 5^i + \frac{5^i-1}{4}} \sqrt[n]{2}\right)^l, \ 0 \le l, j < \frac{n}{2}$$

To control the error in encoding, a scale Δ»1 may be applied. Then, let W be the $$\frac{n}{4} \times \frac{n}{2}$$

matrix whose i-th row is $$\Delta \cdot z_{i,\_} \cdot V_i^{-1}.$$

An $$\frac{n}{2} \times \frac{n}{2}$$

matrix may be defined as:

$$M = \left\lfloor \left(\frac{U}{\overline{U}}\right)^{-1} \left(\frac{W}{\overline{W}}\right) \right\rceil$$

where each entry in the matrix M is rounded to the nearest integer.

That is, the matrix M represents the coefficients of the polynomial M(X, Y) which results in the mapping:

$$z_{i,j} = \frac{1}{\Delta} M\left(X = \zeta_n^{5^i}, \; Y = \zeta_n^{2 \cdot j \cdot 5^i + \frac{5^i - 1}{4}} \sqrt[n]{2}\right) \tag{1}$$

where $\zeta_n$ is the primitive $n^{th}$ root of unity, i.e., $$e^{\frac{2\pi i}{n}}.$$

Due to the rounding of the entries in the matrix M, the encoding and decoding mappings result in:

$$z \xrightarrow[encode]{} m(X) \xrightarrow[decode]{} z'$$

where z' is an approximation of z, with the error z'−z controlled by the scaling factor Δ. In particular, selecting of a larger Δ results in a smaller error.

Accordingly, in operation, the encoder/decoder 216 may be configured to select an appropriate Δ based on, for example a target number of significant digits to preserve in the entries of the message z.

The key generator 220 is configured to generate keys for encryption and decryption of encoded messages (i.e., polynomials), M(X,Y).

In particular, in the CKKS (Cheon-Kim-Kim-Song) scheme, the key generator 220 may be configured to choose a base $p \in \mathbb{Z}$ and an integer $L \in \mathbb{Z}$. The levels in CKKS area given by $q_l = p^l$ for l=1, . . . , L, namely, $p, p^2, \ldots, p^L$. For each level $q_l$, the ciphertext space is given by $$\mathcal{R}_{q_l}^2 = \mathcal{R}_{q_l} \times \mathcal{R}_{q_l},$$

where $q_l$ is the modulus of the ciphertext space, and where $\mathcal{R}_{q_l}$ is the quotient ring $\mathcal{R}_{q_l} = \mathcal{R}/q_l \mathcal{R}$.

The key generator 220 may then be configured to select a secret $S \in \mathcal{R}$ according to $S \leftarrow HWT(h)$, where h is a positive integer, and HWT(h) is a uniform distribution over the subset of $$\{\pm 1\}^{\frac{n}{2} \times \frac{n}{2}}$$

(i.e., the set of signed binary matrices) whose Hamming weight is h. The key generator 220 is further configured to select a polynomial $a \in \mathcal{R}_{q_l}$ uniformly randomly, i.e., $a \leftarrow \mathcal{U}(\mathcal{R}_{q_l})$. The key generator 220 may further generate an error $e \in \mathcal{R}$, which is a small polynomial, namely $e \leftarrow DG(\sigma^2)$, where DG is a distribution over $$\mathbb{Z}^{\frac{n}{2} \times \frac{n}{2}}$$

that samples its components independently from the discrete Gaussian distribution with variance $\sigma^2$.

Then, the key generator 220 may define the secret key sk=(1, s) and the public key $$pk = (b, a) \in R_{q_L}^2,$$

where $b \in \mathcal{R}_{q_L}$ is given by $b \leftarrow -a \cdot s + e \mod q_L$.

The key generator 220 may further define an evaluation key for use in multiplicative operations in the ciphertext space, as will be described further below, and a switching key for use in converting ciphertext from a ciphertext space based on a first secret key to a ciphertext space based on a second secret key, for example, for a bootstrapping operation, as will be described further below.

First, the key generator 220 may select another integer P and sample a polynomial $$a' \in \mathcal{R}_{P \cdot q_L}$$

uniformly randomly, i.e., $a' \leftarrow \mathcal{U}(\mathcal{R}_{q_L})$ and an error $e' \in \mathcal{R}$, which is a small polynomial in $\mathcal{R}$, i.e., $e' \leftarrow DG(\sigma^2)$. The key generator 220 may then define the evaluation key evk to be evk=(b', a'), where $b' \leftarrow -a' \cdot s + e' + P \cdot s^2 \mod P \cdot q_L$. Furthermore, for another secret $s' \in \mathcal{R}$, the key generator 220 may define the key-switching key swk to be (b', a'), where $b' \leftarrow -a' \cdot s + e' + P \cdot s'$.

The encryptor/decryptor 224 is configured to encrypt encoded messages $M \in \mathcal{R}$ to the ciphertext space $$R_{q_l}^2$$

and to decrypt ciphertext to an encoded message $M \in \mathcal{R}$. In particular, the encryptor/decryptor 224 may use a public key pk to encrypt a message $M \in \mathcal{R}$ by first sampling a polynomial $v \in \mathcal{R}$ given by $v \leftarrow ZO(0.5)$, where $ZO(\rho)$, for $0 \leq p \leq 1$ is a distribution that samples each entry in the n/2×n/2 matrix from {0, ±1} with probability ρ/2 for each of −1 and 1 and with probability 1−ρ for 0. The encryptor/decryptor 224 further samples additional error polynomials $e_1, e_2 \in \mathcal{R}$ given by $e_0, e_1 \leftarrow DG(\sigma^2)$.

The encryptor/decryptor 224 may then encrypt the encoded message M given by: m→ct=v·pk+(M+e₀, e₁) mod $q_L$. That is, $$ct = (c_0, c_1) \in R_{q_L}^2$$

where:

$$c_0 = v \cdot b + M + e_0 \mod q_L$$

$$c_1 = v \cdot a + e_1 \mod q_L$$

The encryptor/decryptor 224 may further decrypt cipher-text $$ct = (c_0, c_1) \in R_{q_l}^2$$

given by $c_0 + c_1 \cdot s$ mod $q_l$.

The manipulator 228 is configured to perform ciphertext manipulations or operations, such as additions, multiplications, rescaling and key switching.

For example, the manipulator 228 may be configured to add two ciphertexts $$ct_1, ct_2 \in R_{q_l}^2,$$

the manipulator 228 may output the sum as $ct_{add} = ct_1 + ct_2$ mod $q_l$. The manipulator 228 may be configured to multiply two ciphertexts $$ct_1 = (B_1, A_1) \in R_{q_l}^2 \text{ and } ct_2 = (B_2, A_2) \in R_{q_l}^2$$

by first determining:

$$(D_0, D_1, D_2) = (B_1 \cdot B_2, A_1 \cdot B_2 + A_2 \cdot B_1, A_1 \cdot A_2) \bmod q_l$$

The manipulator 228 may subsequently re-linearize according to $ct_{mult} = (D_0, D_1) + \lfloor P^{-1} \cdot D_2 \cdot evk \rceil$ mod $q_l$.

In the CKKS scheme, a ciphertext ct at a level I may be transformed to a ciphertext ct' at a lower level l', where l'<l, known as rescaling. The manipulator 228 may rescale the ciphertext $$ct \in R_{q_l}^2$$

according to $ct' \leftarrow \lfloor p^{l'-l} \cdot ct \rceil$ mod $q_{l'}$. The rescaling operation performed by the manipulator 228 defines the ciphertext ct' as an encryption of $p^{l'-l} \cdot m$. That is, the rescaling operation may remove inaccurate least-significant bits (LSBs) incurred, for example, due to rounding steps. The manipulator 228 may also be configured to perform rescaling operations to rescale messages encrypted under the same secret key s at different levels l, l' to the lower level l' to allow preservation of the homomorphic operations (i.e., addition and multiplication).

The manipulator 228 may further be configured to perform a key switching operation, in which a ciphertext $$ct = (c_0, c_1) \in R_{q_l}^2$$

at level l, which represents an encryption of a message m under the secret key s is switched to a ciphertext ct' which represents an encryption of the message m under the secret key s' at the level l. In particular, the manipulator 228 may define the ciphertext ct' according to $ct' \leftarrow (c_0, 0) + \lfloor P^{-1} \cdot c_1 \cdot swk \rceil$ mod $q_l$. Subsequently, when ct' is decrypted with the secret key s', the result will be the message m.

Further, some or all of the functionality of the application 212 may be implemented as dedicated hardware components, such as one or more FPGAs or application-specific integrated circuits (ASICs). For example, each of the encoder/decoder 216, the key generator 220, the encryptor/decryptor 224, and the manipulator 228 may be implemented as an independent ASIC.

The memory 204 also stores a repository 232 storing rules and data for the encryption operation. For example, the repository 232 may store the n-th root of unity and the other roots of the polynomials, the keys generated by the key generator 220, and the like.

The device 104 further includes the communications interface 208 interconnected with the processor 200. The communications interface 208 may be configured for wireless (e.g., satellite, radio frequency, Bluetooth, Wi-Fi, or other suitable communications protocols) or wired communications and may include suitable hardware (e.g., transmitters, receivers, network interface controllers, and the like) to allow the device 104 to communicate with other computing devices. The specific components of the communications interface 208 are selected based on the types of communication links that the device 104 communicates over.

The device 104 may further include one or more input and/or output devices (not shown). The input devices may include one or more buttons, keypads, touch-sensitive display screen, mice, or the like for receiving input from an operator. The output devices may include one or more display screens, monitors, speakers, sound generators, vibrators, or the like for providing output or feedback to an operator.

The device 108 may include similar internal components, including the application 212, and may generate a different secret key for the device 108.

Figure 3:
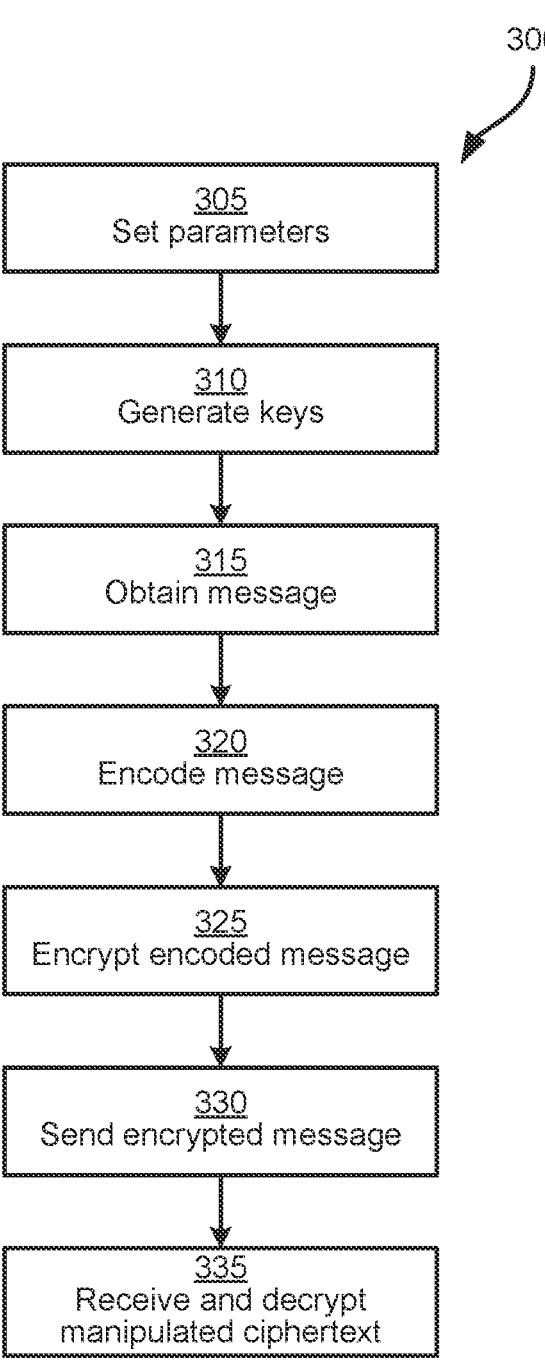
FIG. 3 depicts a flowchart of an example method for approximate homomorphic ring encryption.

Turning now to FIG. 3, the functionality implemented by the device 104 will be discussed in greater detail. FIG. 3 illustrates a method 300 of approximate homomorphic ring encryption. The method 300 will be discussed in conjunction with its performance in the system 100, and particularly by the device 104, via execution of the application 212. In particular, the method 300 will be described with reference to the components of FIGS. 1 and 2. In other examples, the method 300 may be performed by other suitable devices or systems.

At block 305, the device 104 may set parameters for the encoder/decoder 216, the key generator 220, the encryptor/decryptor 224, and the manipulator 228. For example, for a given security parameter λ (e.g., as selected according to a desired security for a given application of the encryption system), the device 104 may choose a base positive integer p(>Δ) and a positive integer L. The device 104 may then choose a power-of-two integer n, integers P, h, and a real positive number σ such that the RLWE problem in $\mathcal{R}$ achieves λ bits of security.

At block 310, the device 104, and in particular, the key generator 220, is configured to generate a set of keys. Specifically, the key generator 220 may generate a public key for encrypting encoded messages in $\mathcal{R}$ to generate ciphertexts and a secret key to decrypt ciphertexts to encoded messages in $\mathcal{R}$. In some examples, the key generator 220 may generate one or more additional secret keys (e.g., for bootstrapping operations), as well as corresponding key-switching keys to convert a ciphertext encrypted under a first secret key to a ciphertext encrypted under a different secret key. The key generator 220 may further generate an evaluation key to be applied in multiplicative operations. The device 104 may then be configured to publish the non-secret keys—i.e., the public key, the evaluation key, and the switching key.

At block 315, the device 104 is configured to obtain a message z to be sent to a target device, such as the device 108. For example, the message z may represent a set of data values, for example for storage on the cloud, for manipulation and analysis in regulated industries, such as healthcare, finance, or other applications in which preserving client privacy is prioritized. Accordingly, the message z may be sent to the target device 108 via homomorphic encryption so as to allow the target device 108 to manipulate the data without decrypting the message z.

In particular, the message z may have the form of an $$\frac{n}{4} \times \frac{n}{2}$$

matrix with entries $z_{i,j} \in \mathbb{C}$, where $n = 2^l$ for some $l \in \mathbb{Z}$.

At block 320, the device 104, and in particular, the encoder 216, is configured to encode the message z to a polynomial M(X, Y) in the polynomial ring $$R = \mathbb{Z}[X, Y]/\left\langle X^{\frac{n}{2}} + 1, Y^{\frac{n}{2}} - \left(X^{\frac{n}{8}} - X^{\frac{3n}{8}}\right)\right\rangle.$$

In particular, the encoder 216 encodes the polynomial $$M(X, Y) = \sum_{i=0}^{\frac{n}{2}-1} \sum_{j=0}^{\frac{n}{2}-1} m_{i,j} X^i Y^j, \ m_{i,j} \in \mathbb{Z}$$

such that $$z_{i,j} = \frac{1}{\Delta} M\left(X = \zeta_n^{5^i}, \ Y = \zeta_n^{2 \cdot j \cdot 5^i + \frac{5^i - 1}{4}} \sqrt[n]{2}\right).$$

That is, the encoder 216 may determine the mapping $\sigma^{-1}$ as described above, and apply the mapping $\sigma^{-1}$ to the message z obtained at block 315 to encode the message z to the polynomial M(X,Y).

At block 325, the device 104, and in particular, the encryptor 224, is configured to encrypt the polynomial M(X,Y) generated at block 320 to generate a ciphertext ct. For example, the encryptor 224 may apply the public key pk generated at block 310 and output $V \cdot pk + (M + E_0, E_1) \mod q_L$ as the ciphertext ct. Specifically, the device 104 may use its own public key pk to encrypt the encoded message M when security and privacy of the message z is desired. In other examples, the device 104 may apply the public key of the target device 108 to which the message z is to be sent to allow the target device 108 to decrypt and decode the message z.

At block 330, the device 104 is configured to send the ciphertext generated at block

325 to the target device 108. For example, the device 104 may send the ciphertext via the communications interface 208 via the link 112 to the device 108.

Figure 4:
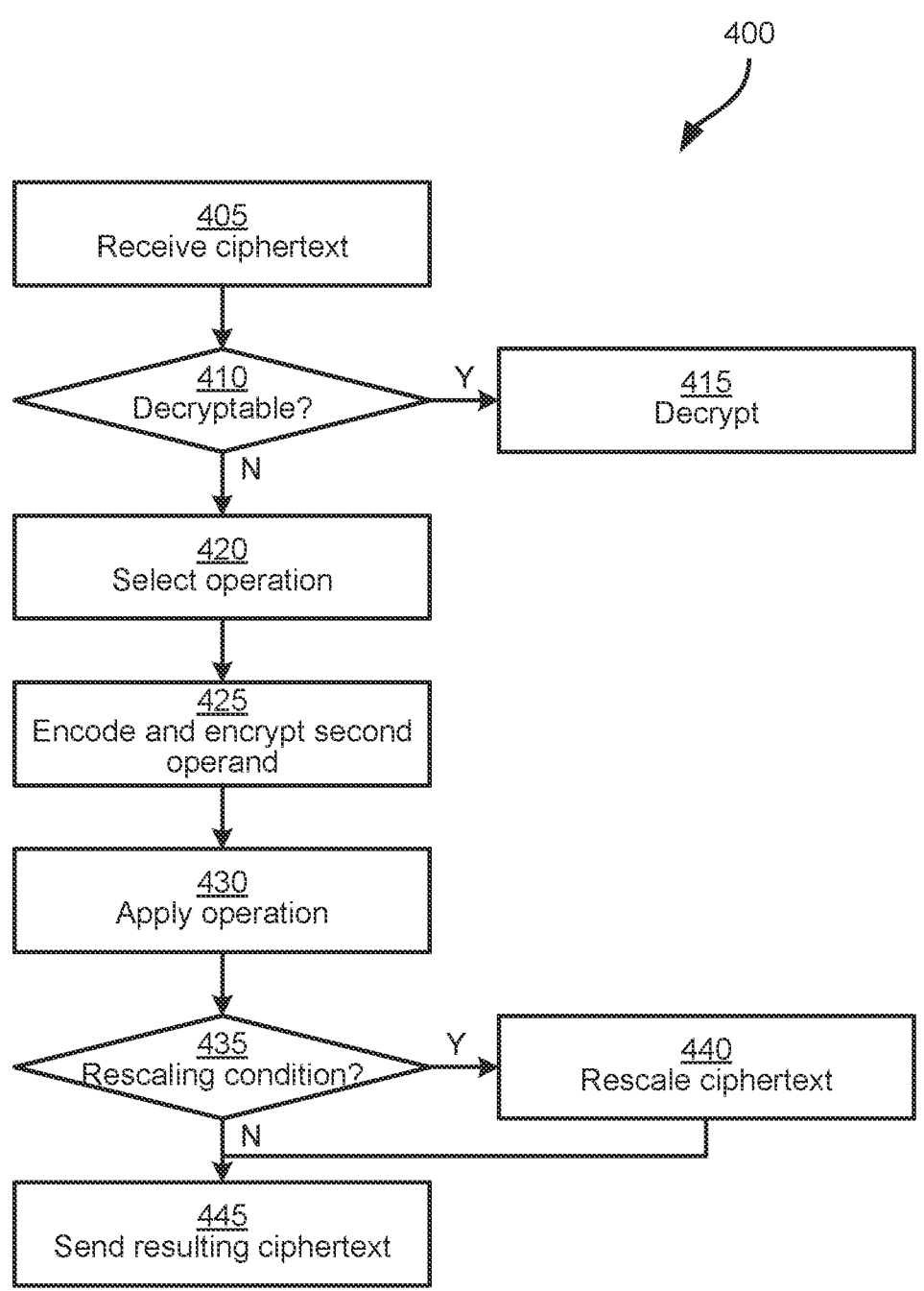
FIG. 4 depicts a flowchart of an example method for manipulating ciphertext with approximate homomorphic ring encryption.

Turning now to FIG. 4, a flowchart of an example method 400 of encrypted homomorphic operations is depicted. The method 400 will be discussed in conjunction with its performance in the system 100, and particularly by the device 108.

At block 405, the device 108 receives a ciphertext $ct_1$, for example from the device 104 after performance of the block 330 of the method 300.

At block 410, the device 108 may determine whether it is able to decrypt the ciphertext. For example, if the ciphertext was encrypted using the public key corresponding to the secret key of the device 108, then the device 108 may apply the secret key, at block 415, to the ciphertext to decrypt the ciphertext.

If, at block 410, the device 108 is not able to decrypt the ciphertext, then the device 108 may proceed to block 420. At block 420, the device 108 may identify an operation to be applied to the ciphertext. For example, the operation may be an addition or a multiplication. In particular, the ciphertext may represent one operand of the operation, and the device 108 may provide the second operand of the operation.

Accordingly, in order to apply the operation in the ciphertext space, the device 108 may be configured to obtain the second operand or message and convert it to the ciphertext space. In particular, at block 425, the device 108 may be configured to encode the message to a polynomial in the polynomial ring $\mathcal{R}$, for example, by determining a corresponding encoding map $\sigma^{-1}$ for the message. The device 108 may then encrypt the encoded message using the public key pk for the device 104 to generate a second ciphertext $ct_2$, such that the ciphertext $ct_1$ received at block 405 and the ciphertext $ct_2$ are encrypted under the same secret key.

At block 430, the device 108 may apply the operation on the received ciphertext $ct_1$ and the generated ciphertext $ct_2$ to obtain a resulting ciphertext $ct_r$. For example, the resulting ciphertext may be the result of a multiplication operation (i.e., by multiplying and re-linearizing the result using the evaluation key for the device 104) or an addition operation.

At block 435, the device 108 may determine whether a rescaling condition is met. For example, the ciphertext received at block 405 may have an associated operation counter, to determine how many operations (or, in particular, how many multiplication operations) have been applied to the ciphertext. If the counter exceeds a predefined threshold, the device 108 may make an affirmative determination at block 435 and proceed to block 440 to rescale the ciphertext. In other examples, other rescaling conditions are also contemplated.

If the determination at block 435 is negative, or after rescaling the ciphertext at block 440, the device 108 may be configured to proceed to block 445 to send the manipulated ciphertext to another target device. For example, the target device may be a further device (i.e., other than the device 104, for example, for additional manipulations and/or operations to be applied), or the target device may be the device 104—i.e., the device 108 may return the resulting ciphertext to the originating source device 104.

Accordingly, returning to FIG. 3, at block 335, may optionally receive a manipulated ciphertext and decrypt the ciphertext using the secret key.

As described herein, a system is provided for encoding messages according to a new two-variable polynomial ring. The elements of the two-variable polynomial ring may be encrypted under a RLWE approach to securely encrypt message with resistance to post-quantum attacks. Further, the basis of the two-variable polynomial ring may provide efficient operations during the encryption operation and subsequent manipulation operations.

In this application, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present application.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In this application, "at least one" means one or more, and "a plurality of" means two or more. "and/or" describes an association relationship of associated objects, and indicates that there may be three relationships. For example, A and/or B may indicate cases includes "only A", "both A and B", and "only B", where A and B may be singular or plural. The character "/" generally indicates that the associated objects are in an OR relationship. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). For example, "at least one of the following items" or a similar expression thereof refers to any combination of these items, including any combination of a single item or a plurality of items. For example, "at least one of a, b, or c" may represent a, b, c, "a and b", "a and c", "b and c", or "a, b and c", where a, b, and c may be a single or multiple form.

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The scope of the claims should not be limited by the embodiments set forth in the above examples but should be given the broadest interpretation consistent with the description as a whole.

The invention claimed is:

1. A device comprising:

a memory;

a communications interface; and a processor interconnected with the memory and the communications interface, the processor configured to:

obtain a message z to be securely sent to a target device, wherein the message z is an (n/4)×(n/2) matrix with entries $z_{i,j} \in \mathbb{C}$, $0 \leq i < n/4$ and $0 \leq j < n/2$ and wherein $n=2^l$, where $1 \in \mathbb{Z}$;

encode the message z to a polynomial M(X, Y) in a polynomial ring $$\mathcal{R} = \mathbb{Z}[X, Y] \big/ \big\langle X^{n/2} + 1, Y^{n/2} - \big(X^{n/8} - X^{3n/8}\big)\big\rangle$$

wherein $$M(X, Y) = \sum_{i=0}^{n/2-1} \sum_{j=0}^{n/2-1} m_{i,j} X^i Y^j, m_{i,j} \in \mathbb{Z}$$

such that $$z_{i,j} = \frac{1}{\Delta} M\bigg(X = \zeta_n^{s^i}, Y = \zeta_n^{2j \cdot s^i + \frac{s^i-1}{4}} \sqrt[n]{2}\bigg)$$

where $\zeta_n$ is an $n^{th}$ root of unity, and $\Delta \in \mathbb{Z}$;

encrypt the polynomial M(X, Y) with a public key to obtain a ciphertext; and send the ciphertext to the target device.

2. The device of claim 1, wherein the processor is further configured to:

generate a secret key for secure encryption; and generate the public key based on the secret key.

3. The device of claim 2, wherein the processor is configured to generate the secret key and the public key by:

selecting a secret $s \in \mathcal{R}$ according to S←HWT(h), where h is a positive integer, and HWT(h) is a uniform distribution over a subset of $$\{\pm 1\}^{\frac{n}{2} \times \frac{n}{2}};$$

selecting a polynomial $a \in \mathcal{R}_{q_L}$ uniformly randomly;

selecting a small polynomial, namely $e \leftarrow DG(\sigma^2)$, where DG is a distribution over $$\mathbb{Z}^{\frac{n}{2} \times \frac{n}{2}}$$

that samples its components independently from a discrete Gaussian distribution with variance $\sigma^2$; and defining the secret key to be sk=(1, s); and defining the public key to be $$pk = (b, a) \in \mathcal{R}_{q_L}^2,$$

where $b \in \mathcal{R}_{q_L}$ is given by $b \leftarrow -a \cdot s + e \bmod q_L$.

4. The device of claim 3, wherein the processor is further configured to:

generate an evaluation key for use in multiplicative operations.

5. The device of claim 4, wherein the processor is configured to generate the evaluation key by:

selecting an integer P;

selecting a polynomial $$a' \in \mathcal{R}_{P \cdot q_L}$$

uniformly randomly;

selecting the small polynomial, namely $e' \leftarrow DG(\sigma^2)$, where DG is the distribution over $$\mathbb{Z}^{\frac{n}{2} \times \frac{n}{2}}$$

that samples its components independently from the discrete Gaussian distribution with variance $\sigma^2$; and defining the evaluation key to be $$evk = (b', a') \in R_{q_L}^2,$$

where $b' \in \mathcal{R}_{q_L}$ is given by $b' \leftarrow -a' \cdot s + e' + P \cdot s^2 \bmod P \cdot q_L$.

6. The device of claim 3, wherein the processor is further configured to:

generate a switching key for use in converting the ciphertext from a first ciphertext space based on a first secret key to a second ciphertext space based on a second secret key.

7. The device of claim 6, wherein the processor is configured to generate the switching key by:

selecting an integer P;

selecting a polynomial $$a' \in \mathcal{R}_{P \cdot q_L}$$

uniformly randomly;

selecting the small polynomial, namely $e' \leftarrow DG(\sigma^2)$, where DG is the distribution over $$\mathbb{Z}^{\frac{n}{2} \times \frac{n}{2}}$$

that samples its components independently from the discrete Gaussian distribution with variance $\sigma^2$; and defining the switching key swk, for another secret $s' \in \mathcal{R}$, to be swk=(b', a'), where $b' \in \mathcal{R}_{q_L}$ is given by $b' \leftarrow -a' \cdot s + e' + P \cdot s' \bmod P \cdot q_L$.

8. The device of claim 1, wherein the processor is further configured to:

receive a manipulated ciphertext comprising a result of an operation performed on the ciphertext;

decrypt the manipulated ciphertext using a secret key corresponding to the public key; and decode the decrypted manipulated ciphertext to obtain a manipulated message, the manipulated message represents a result of the operation as performed on the message.

9. A method comprising:

obtaining a message z to be securely sent to a target device, wherein the message z is an $$\left(\frac{n}{4}\right) \times \left(\frac{n}{2}\right)$$

matrix with entries $$z_{i,j} \in \mathbb{C}, \; 0 \le i < \frac{n}{4} \text{ and } 0 \le j < \frac{n}{2}$$

and wherein $n = 2^l$, where $l \in \mathbb{Z}$;

encoding the message z to a polynomial M(X, Y) in a polynomial ring $$\mathcal{R} = Z[X, Y] / \left\langle X^{n/2} + 1, \; Y^{n/2} - \left(X^{n/8} - X^{3n/8}\right) \right\rangle$$

wherein $$M(X, Y) = \sum_{i=0}^{\frac{n}{2}-1} \sum_{j=0}^{\frac{n}{2}-1} m_{i,j} X^i Y^j, \; m_{i,j} \in \mathbb{Z}$$

such that $$z_{i,j} = \frac{1}{\Delta} M\left(X = \varsigma_n^{5^i}, \; Y = \varsigma_n^{2j \cdot 5^i + \frac{5^i - 1}{4}} \sqrt[n]{2}\right)$$

where $\zeta_n$ is an $n^{th}$ root of unity, and $\Delta \in \mathbb{Z}$;

encrypting the polynomial M(X, Y) with a public key to obtain a ciphertext; and sending the ciphertext to the target device.

10. The method of claim 9, wherein encrypting the polynomial M comprises:

sampling $V \leftarrow ZO(0.5)$ and $E_0, E_1 \leftarrow DG(\sigma^2)$, for a real positive number $\sigma$, where:

ZO(p) for $0 \le p \le 1$ is a distribution that samples each entry in an $$\frac{n}{2} \times \frac{n}{2}$$

matrix from $\{0, \pm 1\}$ with probability $$\frac{\rho}{2}$$

for both of $-1$ and $1$, and with probability $1\rho$ for $0$; and $DG(\sigma^2)$ is a distribution over $$\mathbb{Z}^{\frac{n}{2} \times \frac{n}{2}}$$

that samples components independently from a discrete Gaussian distribution with variance $\sigma^2$; and outputting, as the ciphertext, $V \cdot pk + (M + E_0, E_1) \bmod q_L$, where pk is the public key, and $q_L = p^L$ for a base positive integer $p > \Delta$ and a positive integer L.

11. The method of claim 9, further comprising: selecting parameters such that a ring-learning with errors (RLWE) problem in $\mathcal{R}$ achieves a target threshold $\lambda$ bits of security.

12. The method of claim 9, further comprising:

receiving a manipulated ciphertext comprising a result of an operation performed on the ciphertext;

decrypting the manipulated ciphertext using a secret key corresponding to the public key; and decoding the decrypted manipulated ciphertext to obtain a manipulated message, wherein the manipulated message represents a result of the operation as performed on the message.

13. The method of claim 12, wherein decrypting the manipulated ciphertext comprises:

and the secret key given for the manipulated ciphertext given by $$ct = (c_0, c_1) \in \mathcal{R}_{q_l}^2,$$

and the secret key given by s, determining $c_0 + c_1 \cdot s \bmod q_l$.

14. A device comprising:

a memory;

a communications interface; and a processor interconnected with the memory and the communications interface, the processor configured to:

receive a first ciphertext $ct_1$ encrypted from a first polynomial $M_1(X, Y)$ in a polynomial ring $\mathcal{R} = \mathbb{Z}[X, Y]/\langle (X^{n/2}+1, Y^{n/2}-(X^{n/8}-X^{3n/8}) \rangle$ using a public key pk;

select an operation to be applied to the first ciphertext and obtain a second message to be used as a second operand for the operation;

encode the second message to a second polynomial $M_2(X, Y)$ in the polynomial ring $\mathcal{R}$;

encrypting the second polynomial $M_2(X, Y)$ using the public key pk to obtain a second ciphertext $ct_2$;

apply the operation on $ct_1$ and $ct_2$ to obtain a resulting ciphertext $ct_r$; and sending the resulting ciphertext $ct_r$ to a target device.

15. The device of claim 14, wherein the operation is addition, and the processor is configured to output the resulting ciphertext as: $ct_r = ct_1 + ct_2 \bmod q_l$.

16. The device of claim 14, wherein the operation is multiplication, and the processor is configured to:

determine, for $ct_1 = (B_1, A_1)$ and $ct_2 = (B_2, A_2)$, $(D_0, D_1, D_2) = (B_1 \cdot B_2, A_1 \cdot B_2 + A_2 \cdot B_1, A_1 \cdot A_2) \bmod q_l$; and re-linearize according to $ct_r = (D_0, D_1) + \lfloor P^{-1} \cdot D_2 \cdot evk \rceil \bmod q_l$, for an evaluation key evk corresponding to a secret key.

17. The device of claim 16, wherein the processor is further configured to rescale the resulting ciphertext $ct_r$ from a level l to a lower level l' according to $ct' \leftarrow \lfloor p^{l'-1} \cdot ct \rceil \bmod q_{l'}$.

18. A non-transitory computer-readable medium storing instructions, which when executed by a processor, cause the processor to:

obtain a message z to be securely sent to a target device, wherein the message z is an $(n/4) \times (n/2)$ matrix with entries $z_{i,j} \in \mathbb{C}$, $0 \le i < n/4$ and $0 \le j < n/2$ and wherein $n = 2^l$, where $l \in \mathbb{Z}$;

encode the message z to a polynomial $M(X, Y)$ in a polynomial ring $$\mathcal{R} = \mathbb{Z}[X, Y]/\langle X^{n/2} + 1, Y^{n/2} - (X^{n/8} - X^{3n/8}) \rangle$$

wherein $$M(X, Y) = \sum_{i=0}^{n/2-1} \sum_{j=0}^{n/2-1} m_{i,j} X^i Y^j, m_{i,j} \in \mathbb{Z}$$

such that $$z_{i,j} = \frac{1}{\Delta} M\left(X = \zeta_n^{5^i}, Y = \zeta_n^{2 \cdot j \cdot 5^i + \frac{5^i - 1}{4}} \sqrt[n]{2}\right)$$

where $\zeta_n$ is an nth root of unity, and $\Delta \in \mathbb{Z}$;

encrypt the polynomial $M(X, Y)$ with a public key to obtain a ciphertext; and send the ciphertext to the target device.

19. The non-transitory computer-readable medium of claim 18, wherein the instructions further configure the processor to:

select a secret $s \in \mathcal{R}$ according to $S \leftarrow HWT(h)$, where h is a positive integer, and $HWT(h)$ is a uniform distribution over a subset of $$\{\pm 1\}^{\frac{n}{2} \times \frac{n}{2}};$$

select a polynomial $a \in \mathcal{R}_{q_L}$ uniformly randomly;

select a small polynomial, namely $e \leftarrow DG(\sigma^2)$, where DG is a distribution over $$\mathbb{Z}^{\frac{n}{2} \times \frac{n}{2}}$$

that samples its components independently from a discrete Gaussian distribution with variance $\sigma^2$; and define a secret key to be $sk = (1, s)$; and define the public key to be $$pk = (b, a) \in \mathcal{R}_{q_L}^2,$$

where $b \in \mathcal{R}_{q_L}$ is given by $b \leftarrow -a \cdot s + e \mod q_L$.

20. The non-transitory computer-readable medium of claim 18, wherein the instructions further configure the processor to:

receive a manipulated ciphertext comprising a result of an operation performed on the ciphertext;

decrypt the manipulated ciphertext using a secret key corresponding to the public key; and decode the decrypted manipulated ciphertext to obtain a manipulated message, the manipulated message represents a result of the operation as performed on the message.

\* \* \* \* \*